United States Patent [19]

Dawans et al.

[11] 4,396,731

[45] Aug. 2, 1983

[54] COMPOSITIONS OF COATED WATER-SOLUBLE POLYMERS, THEIR MANUFACTURE AND THEIR USE TO PREPARE AQUEOUS SOLUTIONS FOR USE IN ENHANCED OIL RECOVERY

[75] Inventors: François Dawans, Bougival; Daniel Binet, Rueil-Malmaison; Norbert Kohler, Le Chesnay; Quang Dans Vu, Paris, all of France

[73] Assignee: Institut Francais du Petrole, Rueil-Malmaison, France

[21] Appl. No.: 286,322

[22] Filed: Jul. 24, 1981

[30] Foreign Application Priority Data

Jul. 24, 1980 [FR] France ............................ 80 16312

[51] Int. Cl.$^3$ .............................................. C08K 9/02
[52] U.S. Cl. .................................. 523/207; 106/191; 264/123; 264/126; 264/191; 428/407; 524/207; 524/275; 524/279; 524/321; 524/385; 524/490
[58] Field of Search ............... 524/207, 275, 279, 321, 524/385, 490; 106/191; 428/407; 523/207; 264/123, 126, 300

[56] References Cited

U.S. PATENT DOCUMENTS

| | | | |
|---|---|---|---|
| 3,350,338 | 10/1967 | Savage | 526/260 |
| 3,546,150 | 12/1970 | White | 524/207 |
| 4,102,850 | 7/1978 | Cooper et al. | 524/207 |
| 4,327,151 | 4/1982 | Mazzola | 428/407 |

*Primary Examiner*—Melvyn I. Marquis
*Attorney, Agent, or Firm*—Millen & White

[57] ABSTRACT

A solid composition of coated water-soluble polymer is made from 80 to 250 parts b.w. of solid particles of at least one water-soluble polymer coated with 100 parts b.w. of at least one paraffinic product solid at room temperature and whose melting point is preferably from 40° to 90° C. The solid composition is made by dispersing particles of the water-soluble polymer in the molten paraffinic product and then cooling down to room temperature.

26 Claims, No Drawings

COMPOSITIONS OF COATED WATER-SOLUBLE POLYMERS, THEIR MANUFACTURE AND THEIR USE TO PREPARE AQUEOUS SOLUTIONS FOR USE IN ENHANCED OIL RECOVERY

BACKGROUND OF THE INVENTION

This invention relates to coated compositions of water-soluble polymers, their manufacture and their use in enhanced oil recovery.

The world energy crisis has made it essential to recover as much oil as possible from oil-fields.

One of the most widely used methods of enhanced recovery consists of flooding the oil-field with injected saline water, thus obliging the oil to cool off and leave the pores of the rock where it stands absorbed.

The efficiency of this method is however often impaired by the difference of viscosity between oil and water, which difference causes water to flow through preferential paths directly from the injection well into the production well, instead of spreading through the whole deposit.

It is usual to reduce this viscosity difference by thickening the injection water with water-soluble polymers, very often with a polyacrylamide, optionally partially hydrolysed, or with a polysaccharide.

The storage and handling of these polymers on the field has raised a number of practical problems.

As a matter of fact, the powdered polymers have the property to absorb water from the air. This absorption results in swelling and formation of agglomerates and/or microgels.

The agglomerates tend to stick on the walls and thus to inhibit the running of the mixing devices, particularly the feed screw.

The microgels do not dissolve easily in water and, once injected into the oil-field, they tend to clog the openings of the pores of the oil-containing rock.

On the other hand, the polymer powder spreads in the air and on the ground, which raises safety problems by making the ground thick and slippery and the atmosphere hardly breathable.

To obviate these drawbacks, the prior art has proposed a number of processes to disperse the solid particles of water-soluble polymers in an organic liquid which is a non-solvent for the polymer.

For example, fluid dispersions of water-soluble polymers have been obtained by adding the polymers to an anhydrous non-solvent medium, in the presence of a surface-active agent and optionally a thickening agent to make the suspensions stable; such compositions have been described in the U.S. Pat. No. 3,282,874, the British Pat. No. 1,397,933 and in the European patent application No. 002 368 and they are characterized by the use of a hydrocarbon which is liquid at room temperature, as a non-solvent medium for the polymers.

The prior art has also taught to coat the water-soluble polymers, so as to protect them, either with sorbitol or mannitol, as disclosed, for example, in the Japanese patent application No. 4 744 335, or with a monoalkylether of diethylene glycol, as disclosed, for example, in the U.S. Pat. No. 3,350,338. However, taking the sensitivity of these coating agents to water into account, the protection of the polymers is not completely satisfactory.

It is thus desirable to obtain stabilized compositions in the solid state, in order to improve and simplify the handling and the storing of the water-soluble polymers, and this is the object of this invention.

SUMMARY OF THE INVENTION

It has been found that the solid particles of water-soluble polymers can be coated with an inert protective layer, which is solid at room temperature and later disappears easily when dispersing and dissolving the polymers in hot water.

DETAILED DISCUSSION

The new solid compositions of water-soluble polymers according to the invention are more particularly appropriate to improve enhanced oil recovery in an oil-field. All the usual processes of filtration used in oil-fields may be applied without major difficulty to the compositions of the invention, such as filtration through a cartridge-filter, a felt-filter, diatomaceous earth, standard fibers of the Millipore type, etc.

As a rule, the solid compositions of water-soluble polymers accoding to the invention comprise:

(a) from 80 to 250 parts by weight of at least one water-soluble polymer as solid particles (powder, balls, agglomerates), the size of these particles ranging, for example, from a few microns to 5 mm, for (b) 100 parts by weight of paraffinic products having a melting point higher than room temperature and usually comprised between 40° to 90° C., and optionally (c) from 0.1 to 5 parts by weight of at least one non-ionic or anionic surface-active agent.

The process of the invention can be applied to all the water-soluble polymers known in the art, such as those having a linear or branched polyalkane backbone structure, comprising a sufficient number of hydrophilic groups to make the polymer soluble in aqueous phase, the hydrophilic groups being preferably selected from caboxylate, sulfonate, amine, imine, ammonium, carboxamide, imide, hydroxy, acetyl, cetyl, carbamate or lactam groups.

Examples of these water-soluble polymers are: aminoethyl poly(meth-)acrylates, polyvinylpyridine, polyvinylpyrrolidone, polyvinylbenzyltrimethylammonium chloride, sulfonated polystyrene, polyoxyethylene, polyethylene imine, polyvinyloxazolidinone and the hydrolysis derivatives of poly(meth-)acrylonitrile. Particularly preferred are the polymers or copolymers resulting from the polyaddition of vinylic or acrylic monomers comprising hydroxy or amide substituents, such as polyvinyl alcohol, cellulosic derivatives, such as carboxymethylcellulose, hydroxyethylcellulose and carboxymethylhydroxyethylcellulose, polysaccharides, such as "xanthane" or "scleroglycane" gums, polyacrylic and polymethacrylic acids and their salts, polyacrylamides, polymethacrylamides, poly-N,N-dimethylamino-acrylamides and acrylamide-acrylic acid, ethylene-acrylic acid and styrene-maleic acid copolymers.

The paraffinic materials (b) to be used as coating substances for the water-soluble polymers are selected from the products having a melting point higher than room temperature, for example, higher than 20° C. and preferably between 40° and 90° C., this temperature range representing the best compromise between the temperatures of manufacturing the compositions according to the invention (to avoid any degradation of the polymers), of storing these compositions without particular care and of their further re-dissolution in hot water.

The paraffinic materials usually contain from 14 to 35 carbon atoms; they are either saturated aliphatic hydrocarbons such as hereicosane, docosane, tricosane, tetracosane, pentacosane, hentriacontane, dotriacontane, pentatriacontane, or natural or synthetic mono-alcohols with a long saturated aliphatic chain, such as 1-n-hexadecanol, 1-n-octadecanol, 1-n-eicosanol, or mixtures of $C_{14}$ to $C_{26}$ monoalcohols, or fractions of low volatility from the petroleum distillation, such as waxes, vaselines or petrolatums.

The paraffinic materials to be used in the invention may optionally be partially oxidized, hydroxylated or maleinized to improve their compatibility in aqueous phase, and thus to facilitate the further dissolution of the polymer into water.

At least one surfactive agent (c), used in a proportion of from about 0.1 to 5 parts by weight for 100 parts by weight of the paraffinic materials (b), may be added to the compositions of the invention, in order to facilitate the further dispersion of the coated particles and the dissolution of the water-soluble polymer into the aqueous phase. The surfactive agent (c) can be selected, on the one hand, from the non-ionic hydrophilic emulsifiers, such as the condensation products of the higher fatty alcohols, the amides of the higher fatty acids or the alkylphenols with ethylene oxide, or the esters obtained from polyethylene glycol and long-chain fatty acids, and, on the other hand, from the anionic hydrophilic emulsifiers, such as the alkali metal salts of the alkyl- and/or aryl-sulfonic acids, the alkylsulfosuccinic acids or the sulfonic acids derived from petroleum cuts, and the alkali metal alkyl- or alkylene sulfates.

By way of illustration of emulsifying agents well-known in the art and used independently or as mixtures, the following can be named: polyethoxylated nonylphenols, octyl phenol polyethoxyethanol, tetraethylene glycol monopalmitate, hexaethylene glycol monolaurate, nonaethylene glycol monostearate, sodium sulfosuccinate dioctyl ester, sodium diethyl-hexyl sulfosuccinate, sodium monostearylsulfosuccinate, sodium laurylsulfonate, potassium stearylsulfonate, sodium laurylsulfate and petroleum sulfonates.

The compositions of solid particles of coated water-soluble polymers according to the invention can advantageously be prepared as follows.

The particles of water-soluble polymer (for example, as powder, balls, agglomerates, etc.) whose size is from a few microns to 5 millimeters, are first dispersed under stirring in inert atmosphere in the paraffinic material (b) optionally containing one or more non-ionic or anionic surfactive agents, at a temperature higher than the melting temperature of the paraffinic material; the dispersion is then quickly cooled down to room temperature.

According to a particular embodiment of the manufacture of the compositions according to the invention, the solid particles of the water-soluble polymer are first soaked or slightly swollen with a polar compound which will make their further dissolution in water easier. Particular examples of such suitable polar compounds are: isopropanol, ethylene glycol, polyethylene glycol, glycerol and dimethylsulfoxide.

According to a particular embodiment, the compositions of the invention are manufactured by pouring the fluid dispersion of the solid particles of water-soluble polymer in the molten paraffinic material into a mould and cooling it, which provides solid blocks or plates, making the handling, the storing and the further titration of the aqueous solution easier.

According to another embodiment of the manufacture of the compositions according to the invention, the water-soluble polymer coated with the paraffinic material is extruded hot so as to obtain ribbons or filaments which can then be converted to granulates, if desired, thus increasing the velocity of the further dispersion and dissolution of the compositions in hot water.

The compositions of coated water-soluble polymers according to the invention are more particularly adapted to an easy use in an oil-field, to prepare aqueous solutions for enhanced oil recovery.

Their advantages are mentioned hereafter: they confer to the water-soluble polymers an efficient protection against humidity, against formation of agglomerates or microgels and against oxidizing degradation. As a matter of fact, this type of conditioning has the main advantage, with respect to conventional powders, of a better protection against oxygen and other oxidizing agents at the time of the dissolution.

For example, it is no more necessary to incorporate protection agents, such as sulfites or formaldehyde, to the water used to dissolve the polymers; as a matter of fact, the supply of the compositions according to the invention can be effected in-line in the absence of external oxygen and with the use of deposit water considered as air-free.

The compositions of coated water-soluble polymers according to the invention are also protected against mechanical degradation, when mixing the polymer, since the particles are coated with a hydrophobic layer.

The mode of conditioning by coating represents an important economic advantage. Moreover this conditioning results in simplified storage, handling and titration. Thus, for example, the conditioning as plates (or briquettes) or granulates makes the storage easier on the field and the further titration at the time of dissolution more simple. As a matter of fact, the titration was formerly made with the feed screw. The characteristics of the product to be supplied were responsible for many troubles which made the method uncertain and unpredictable.

The compositions of the invention allow the polymers to quickly dissolve in hot water. For example, it has been determined that the highest viscosity of the aqueous solutions prepared from the compositions of the invention is attained after a far shorter time than when directly dispersing the powdered water-soluble polymer, according to the processes of the prior art. Moreover, starting from the compositions of the invention, there is quickly obtained (generally in less than 2 hours) a constant value of the viscosity, as measured with a screen viscosimeter (Screen viscosimeter, see for example R. R. JENNINGS, J. H. ROGERS and T. J. WEST in J. Pet. Tech. (March 1971) pages 391 to 401), which confirms the absence of aggregates and the quality of the resulting aqueous solutions.

For use in enhanced recovery, the content of water-soluble polymer in the aqueous solutions is advantageously from 0.005 to 1% by weight with respect to water.

The following examples illustrate the invention; they are not to be considered as limitative. Examples 5, 6, 7 and 8 are given by way of comparison.

EXAMPLE 1

500 g of polyalkane (paraffin of the trade whose melting point is between 52° and 54° C.) are heated to 60° C. and 2 g of polyethoxylated nonylphenol and 500 g of powdered partially hydrolysed polyacrylamide (PUSHER 700, a product of the trade, sold by Dow Chemicals) are added under stirring. The mixture is stirred at 60° C. for 30 minutes; stirring is then interrupted and the mixture is quickly cooled to 20° C. A solid mass in which polyacrylamide is uniformly dispersed is thus obtained. The whole is stable in the air for several months and can be converted to small particles or granules. When added to an excess of water heated to 80° C., the polymer is made free of its protective coating and dissolves quickly. By subsequent cooling of the aqueous solution to 20° C., the paraffin initially used to coat the polymer can be separated easily by filtration.

The evolution of viscosity of the aqueous solution in the course of time confirms that the complete dissolution of the polymer is obtained in 70 minutes.

EXAMPLE 2

400 g of n-octadecanol (stearyl alcohol) whose melting point is between 54° and 57° C. are heated to 60° C. 600 g of powdered partially hydrolysed polyacrylamide (an acrylamide-acrylic acid copolymer) as PETROGIL AD 37 from Rhone-Poulenc Industries Co is progressively added to the stirred n-octadecanol, and mixing is continued at 60° C. for 15 minutes, before cooling to room temperature. The resultant solid material is stable and, when dispersed into an excess of water heated to 60° C., the polymer dissolves completely in 2 hours.

EXAMPLE 3

600 g of powdered partially hydrolysed polyacrylamide (PETROGIL AD 27 from Rhone-Poulenc Industries Co.) previously admixed with 20 g of dimethylsulfoxide are progressively added to 400 g of stirred petrolatum (WITCO 816, a product of the trade). This mixture is stirred at 70° C. for 30 minutes, so as to obtain a uniform paste which is then quickly cooled down to room temperature. A good dispersion of the polymer in the solid mass is thus obtained, which dissolves quickly in an excess of water at 80° C.

EXAMPLE 4

A mixture in the solid state of 350 g of oxidized petrolatum (a TEXACO TC-5416 product having a melting point of 49° C.) and 650 g of powdered polysaccharide (Rhodopol 23 P of Rhone-Poulenc Industries) is heated and stirred at 55° C. for 30 minutes. After cooling to room temperature, the resultant solid mixture can be stored without particular care and dissolves quickly when stirred in water at 70° C. (in a few hours).

EXAMPLE 5 (comparison)

Example 1 is repeated without coating the powdered polysaccharide with a polyalkane; the polymer grows tacky and sticky after a few hours in the air. It cannot be processed with the conventional techniques applied to powders and granulates; when added to an excess of water at 80° C., the dissolution of the polymer is not complete, even after 2 hours.

EXAMPLE 6 (comparison)

Example 2 is repeated, except that n-octadecanol is substituted with an equivalent amount of sorbitol whose melting point is about 110°–111° C. When the mixture with the polymer is heated to 115° C., all other conditions being the same, the resultant solid grows sticky when contacted with air. When this solid is dispersed in an excess of water heated to 60° C., the dissolution of the polymer is not complete, even after 3 hours.

EXAMPLE 7 (comparison)

When, in example 4, the oxidized petrolatum is replaced by an equivalent proportion of diethylene glycol monomethyl ether, all other conditions being the same, the resultant mixture is pasty and sticky and its dissolution by stirring in water at 70° C. is not complete, even after 24 hours.

EXAMPLE 8 (comparison)

Example 1 is repeated by coating the polyacrylamide with heptane, thus a polyalkane which is liquid at room temperature, all other conditions being the same; there is obtained a mixture which is not stable when stored, which cannot be processed easily and which does not allow a homogeneous proportioning to be obtained when preparing aqueous solutions by dissolution of the polymer into water.

What is claimed is:

1. A solid composition comprising solid particles of a water-soluble polymer coated with a protective coating consisting essentially of a paraffinic material which is a solid at room temperature, the amount of said protective coating being sufficient to protect said water-soluble polymer particles against humidity, agglomeration, microgel formation and oxidative degradation while nevertheless rendering said solid particles quickly dispersible in hot water, wherein said water-soluble polymer is polyvinyl alcohol, a cellulose derivative, a polysaccharide, polyacrylic acid, polymethacrylic acid, a polyacrylate or polymethacrylate salt, polyacrylamide, polymethacrylamide, poly-N,N-dimethylaminoacrylamide or an acrylamide-acrylic acid, ethylene-acrylic acid or styrene-maleic acid copolymer.

2. A solid composition according to claim 1, which comprises 80–250 parts by weight of said solid particles of a water-soluble polymer, and 100 parts by weight of said paraffinic material.

3. A composition according to claim 1, wherein the paraffinic material has a melting point of 40° to 90° C.

4. A solid composition according to claim 1, wherein said water-soluble polymer has a polyalkane backbone structure with a sufficient number of hydrophilic groups selected from carboxylate, sulfonate, amine, imine, ammonium, carboxamide, imide, hydroxy, acetyl, cetyl, carbamate and lactam groups to be soluble in aqueous medium.

5. A solid composition according to claim 1, wherein the water-soluble polymer is a partially hydrolysed polyacrylamide.

6. A solid composition according to claim 1, wherein said paraffinic material is a $C_{14-35}$ saturated aliphatic hydrocarbon, saturated aliphatic monoalcohol or fraction of low volatility from oil distillation.

7. A solid composition according to claim 6, wherein said paraffinic material is partially oxidized, hydroxylated or maleinized.

8. A solid composition according to claim 1, which further comprises 0.1–5 parts by weight of a non-ionic or anionic hydrophilic emulsifying agent.

9. A process for manufacturing a solid composition according to claim 1, comprising the steps of dispersing particles of said water-soluble polymer in said paraffinic material at a temperature higher than its melting point; and cooling the dispersion to a temperature lower than said melting point to form said solid composition.

10. A process according to claim 9, wherein a non-ionic or anionic emulsifying agent is further added to the paraffinic material in the dispersing step.

11. A process according to claim 9, wherein the solid particles of the water-soluble polymer are soaked or swollen with a polar compound selected from isopropanol, ethylene glycol, polyethylene glycol, glycerol and dimethylsulfoxide prior to dispersion in the molten paraffinic material.

12. A process according to claim 9, wherein the dispersion of the solid particles of the water-soluble polymer in the molten paraffinic material is poured into a mould before cooling.

13. A process according to claim 9, wherein the coated water-soluble polymer composition is extruded while still hot but after solidification.

14. In a method of producing thickened aqueous solutions for use in enhanced oil recovery, comprising dispersing a water-soluble polymer in an aqueous medium, the improvement wherein said polymer is dispersed in hot water in the form of a solid coated polymer composition according to claim 1.

15. A method according to claim 14, wherein the amount of said composition dispersed in said aqueous medium is sufficient to produce a concentration of the water-soluble polymer of 0.005–1% by weight with respect to water.

16. A composition according to claim 1, wherein said water-soluble polymer is polyvinyl alcohol.

17. A composition according to claim 1, wherein said water-soluble polymer is carboxymethylcellulose.

18. A composition according to claim 1, wherein said water-soluble polymer is hydroxyethylcellulose.

19. A composition according to claim 1, wherein said water-soluble polymer is carboxymethylhydroxyethylcellulose.

20. A composition according to claim 1, wherein said water-soluble polymer is a polysaccharide.

21. A composition according to claim 1, wherein said water-soluble polymer is polyacrylic acid or polymethacrylic acid.

22. A composition according to claim 1, wherein said water-soluble polymer is a polyacrylate or polymethacrylate salt.

23. A composition according to claim 1, wherein said water-soluble polymer is polyacrylamide or polymethacrylamide.

24. A composition according to claim 1, wherein said water-soluble polymer is poly-N,N-dimethylaminoacrylamide.

25. A composition according to claim 1, wherein said water-soluble polymer is an ethylene-acrylic acid copolymer.

26. A composition according to claim 1, wherein said water-soluble polymer is a styrene-maleic acid copolymer.

* * * * *